(No Model.) 2 Sheets—Sheet 1.
W. CURTISS.
SAWING MACHINE.
No. 545,780. Patented Sept. 3, 1895.
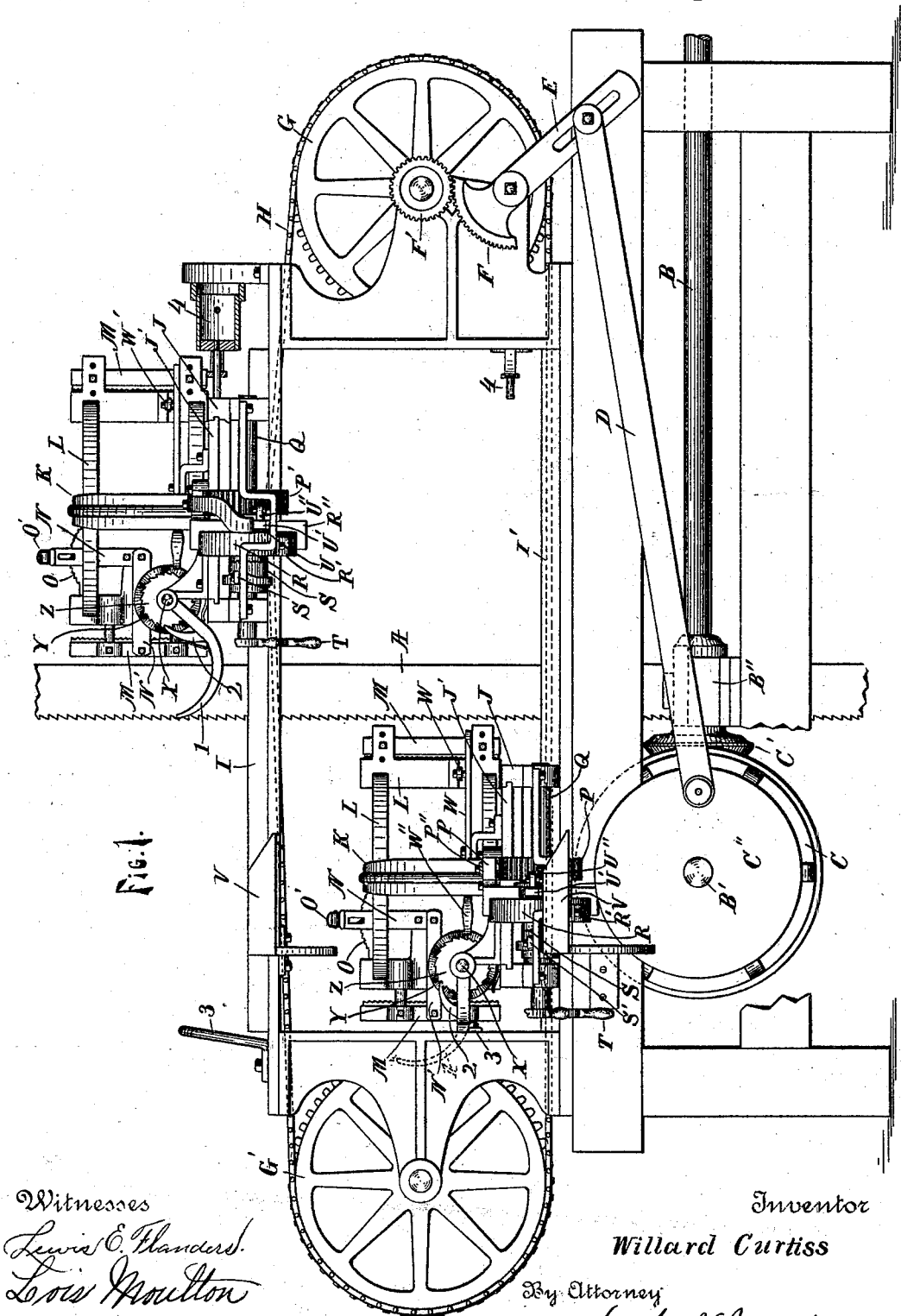
Witnesses
Lewis E. Flanders.
Lois Moulton
Inventor
Willard Curtiss
By Attorney
Luther V. Moulton (No Model.) 2 Sheets—Sheet 2.
W. CURTISS.
SAWING MACHINE.
No. 545,780. Patented Sept. 3, 1895.
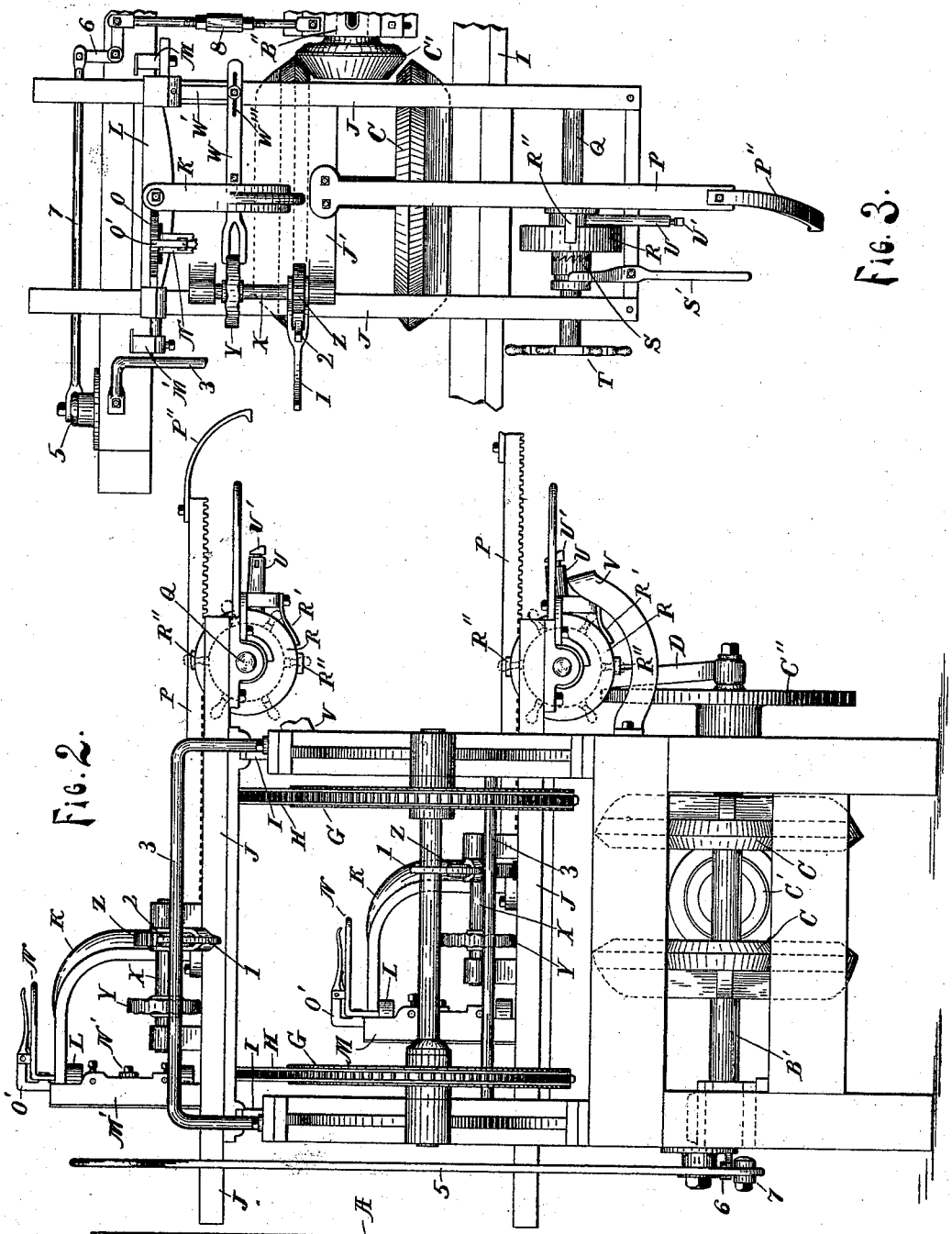
Witnesses
Lewis E. Flanders
Lois Moulton
Inventor
Willard Curtiss
By Attorney
Luther V. Moulton

UNITED STATES PATENT OFFICE.

WILLARD CURTISS, OF GRAND RAPIDS, MICHIGAN.

SAWING-MACHINE.

SPECIFICATION forming part of Letters Patent No. 545,780, dated September 3, 1895.

Application filed April 1, 1895. Serial No. 543,932. (No model.)

*To all whom it may concern:*

Be it known that I, WILLARD CURTISS, a citizen of the United States, residing at Grand Rapids, in the county of Kent and State of Michigan, have invented certain new and useful Improvements in Sawing-Machines; and I do hereby declare the following to be a full, clear, and exact description of the invention, such as will enable others skilled in the art to which it appertains to make and use the same.

My invention relates to improvements in sawing-machines, and its object is to provide the same with certain new and useful features, hereinafter more fully described, and particularly pointed out in the claims, reference being had to the accompanying drawings, in which—

Figure 1 is a side elevation of a device embodying my invention; Fig. 2, an end view of the same, and Fig. 3 a plan view of a part of the same.

Like letters and numerals refer to like parts in all of the figures.

A represents any suitable saw having a rectilinear cutting-edge, cutting in one direction only, being preferably a band-saw arranged to run in a vertical plane near one side of the machine and driven by any suitable means.

B is a driving-shaft rotated by any suitable means and having a laterally-movable journal-bearing B''.

B' is a shaft arranged at right angles to the shaft B and having thereon opposing friction bevel-wheels C C, between which is located a bevel friction-pinion C', mounted on the laterally-moving end of the driving-shaft B and alternately engaged with the wheels C C as the box B'' is moved by means of the lever 5 connected to said box by rods 7 and 8 and the bell-crank 6. A crank-wheel C'' is also on the shaft B' and connected by means of the rod D to a vibrating lever E having a cogged sector F engaging a gear F', which gear is connected to and drives the sprocket-wheel G, which wheel is connected to a similar sprocket-wheel G' near the other end of the machine by means of a chain H. Near the respective upper and lower horizontal parts of said chain are horizontal tracks I and I', on which are mounted carriages J J, which carriages are in duplicate and attached to said chains and are thereby oppositely reciprocated on the said tracks and pass said saw at each movement. I prefer to use two pairs of wheels and two chains; but the carriages may be driven with one chain or a flat strip of steel or other material or grooved wheels and cable or any other known mechanism for such purpose may be used. Dash-pots or spring-buffers 4 are provided to check the inertia of the carriages at each end of the stroke. Each of said carriages is provided with a laterally-movable table J', on which is a vertical frame L, pivoted to vibrate on a central vertical axis and supported by an arm K attached to said table. A rack-bar P is attached to each of said tables to move the same on the carriage, which bar is engaged by a pinion P' on a shaft Q, said shaft being provided with a hand-wheel T and a feed-wheel R, the latter being engaged by a friction spring-brake R' and detachably connected to said shaft to turn the same by a clutch S, operated by a lever S'. Said feed-wheel is moved forward periodically by means of a friction-pawl R'', operated by a lever U, which lever engages an inclined way V and is lifted thereby.

P'' is a hook on the rack-bar P, which, when the table J' has moved toward the saw as far as proper, engages a spring-latch U' on the lever U, and holds said lever in an elevated position, and thus stops further forward movement of the table by preventing the descent of said lever and backward movement of the clutch R'' on the feed-wheel R. On the lever U is an adjustable screw U'', which limits the return movement of said lever and thus determines the amount of feed. The vertical frame L is provided with a fixed dog M, made adjustable for different lengths of work, and a movable dog M', operated by a lever N, connected to the same by a connecting-bar N', and said lever is adjusted and held by a ratchet-sector O and spring-latch O'. Said frame when used for cutting shingles or other tapered work is vibrated on its vertical axis by means of a pivoted lever W, connected to said frame by a connecting-bar W', and provided with a forked end W'', which end engages a serpentine cam-wheel Y, mounted on a shaft X, on which shaft is a ratchet-wheel to turn the same. Said ratchet-wheel is operated by a pawl 2 on a vibrating lever 1, which lever engages and is moved by a bar 3 extending across the machine. The bar W' connects the corresponding ends of the frame L and lever W to cause them to vibrate in unison, and is provided with a pivot movable in a slot W'''.

The number of alternate inclined portions of the wheel Y, whereby the lever W is moved, equal the number of teeth in the wheel Z, which latter is moved one tooth at each stroke of the lever I. The frame L is thus alternately vibrated on its axis at each cut to properly alternate the taper of the piece cut from the bolt. By adjusting the pivot-bolt that connects the lever W and bar W' along the slot W''' the amount of such vibration of the frame L may be varied at pleasure.

The operation of my device is as follows: Suitable bolts are secured to the face of the frames L by means of the dogs M, and as the shaft B rotates the carriages oppositely vibrate along the respective tracks I I. At the end of each backward stroke the lever U is lifted by the inclined way V, and thus the bolt is fed forward toward the saw. At the same time the lever 1 strikes and is lifted by the bar 3 and turns the wheel Z one tooth, which shifts the inclination of the frame L and reverses the taper of the next cut. If straight work is to be made, the said frame is fixed in mid-position and the lever turned over upon the arm K, where it will be inoperative. Should the motion of the carriages need to be reversed for any reason, such as to back out the saw, the lever 5 is moved to bring the pinion C' against the other wheel C.

To run the carriages back the wheel R is disconnected from the shaft Q by moving the clutch S out of engagement, when the hand-wheel will freely operate said shaft and move the table.

I am aware that a circular saw and oppositely-reciprocating carriages have been used; but such saws so arranged cut in opposite directions and simultaneously at both sides. This is objectionable, as the work is very heavy when making such a double cut and tends to quickly lower the speed of the saw and slip the belt, the saw also running idle while the return stroke is being made. By my device the saw engages but one block at a time and is in cut nearly all the time, thus steadying the strain on the belt and securing substantially uniform motion with lighter power required.

I am also aware that a band-saw having two oppositely-cutting edges with two simultaneously-moving carriages is old; but such a device I do not claim.

What I claim is—

1. In a sawing machine, a saw having a single rectilinear cutting edge, and two oppositely reciprocating carriages, alternately engaging the bolts with the edge of said saw, substantially as described.

2. In a sawing machine, a band saw, two carriages arranged one above the other, feed works upon said carriages and operating alternately at the end of the return stroke of said carriages and mechanism for oppositely reciprocating said carriages, substantially as described.

3. In a sawing machine, in combination with two oppositely moving reciprocating carriages having automatic feed mechanisms, an endless chain connected to said carriages, sprocket wheels engaging said chain, a gear connected to one of said wheels, a pivoted lever having a sector engaging said gear, a shaft having a crank wheel, and a pitman connecting said crank wheel and lever and means for rotating said shaft, substantially as described.

4. In a sawing machine in combination with two reciprocating carriages, an endless chain and sprocket wheels and a gear connected to one of said wheels and a pivoted lever, crank wheel shaft and pitman to reciprocate said gear, oppositely faced bevel friction wheels, a bevel friction pinion between said wheels and mounted on a driving shaft, a movable journal box for said shaft and a lever and connecting rods to move said box, substantially as described.

5. In a sawing machine in combination with a saw, and a reciprocating carriage having a transversely movable table and a rack bar attached, and a pinion engaging said bar, and a pawl and lever to operate said pinion, a spring latch and a hook to engage the same, said latch and hook connected to said table and lever, substantially as described.

6. In a sawing machine, in combination with a rack bar, for moving the stock forward to the saw, a shaft having a hand wheel attached, a pinion on said shaft engaging said rack bar, a feed wheel loosely mounted on said shaft, a clutch connecting said wheel and shaft, a lever to operate said clutch, a friction pawl engaging said feed wheel, a lever operating said pawl, a spring catch on said lever, and a hook on said rack bar to engage said catch, substantially as described.

7. In a sawing machine, in combination with a reciprocating carriage, having a transversely movable table, a frame mounted on said table to vibrate on a vertical axis, a lever attached to said frame, a serpentine cam wheel engaging said lever, and mechanism to periodically move said cam wheel, substantially as described.

8. In a sawing machine, a reciprocating carriage, a transversely movable frame on said carriage and pivoted to vibrate on a vertical axis, a forked lever connected to said frame, a shaft having a serpentine cam wheel engaging the forked end of said lever, a ratchet wheel on said shaft, a lever having a pawl engaging said ratchet wheel, and a fixed bar to engage said lever, substantially as described.

9. In a sawing machine in combination with a reciprocating and transversely movable frame, pivoted to vibrate on a vertical axis, and provided with dogs to hold the stock, a lever connected to said frame, having a forked end, a serpentine cam wheel mounted on a shaft and engaging the forked end of said lever, a ratchet wheel having as many teeth as the inclined cam surfaces of said cam wheel, a pivoted lever having a pawl engaging said ratchet wheel, and a fixed bar to engage said lever, substantially as described.

10. In a sawing machine, a reciprocating carriage, a transversely movable table on said carriage, a vertical frame on said table pivoted to vibrate on a vertical axis, a rack bar attached to said table, a shaft having a pinion engaging said rack bar, a feed wheel on said shaft, a friction pawl engaging said feed wheel, a lever operating said friction pawl, and a fixed incline to operate said lever, a lever attached to said vertical vibrating frame, a serpentine cam wheel engaging said lever, a ratchet wheel connected to said cam wheel, a lever having a pawl engaging said ratchet wheel and a fixed bar to operate said lever, substantially as described.

11. In a sawing machine, a reciprocating frame, pivoted to vibrate on a vertical axis, a pivoted lever and means for periodically vibrating the same, a slot in said lever, and a bar pivoted at one end to said frame and at the other to a bolt adjustable in said slot, whereby the vibration of said frame may be varied, substantially as described.

In testimony whereof I affix my signature in presence of two witnesses.

WILLARD CURTISS.

Witnesses:
LUTHER V. MOULTON,
LEWIS E. FLANDERS.